(12) United States Patent
Wehner et al.

(10) Patent No.: US 9,721,449 B2
(45) Date of Patent: Aug. 1, 2017

(54) VEHICLE KEYFOB LOCATOR SYSTEM

(71) Applicant: Nissan North America, Inc., Franklin, TN (US)

(72) Inventors: Adam Wehner, Farmington Hills, MI (US); Balkishan Malay Gupta, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 44 days.

(21) Appl. No.: 14/868,737

(22) Filed: Sep. 29, 2015

(65) Prior Publication Data

US 2017/0092104 A1    Mar. 30, 2017

(51) Int. Cl.

| | |
|---|---|
| *G06F 15/00* | (2006.01) |
| *G08B 29/00* | (2006.01) |
| *G06F 7/04* | (2006.01) |
| *G08B 21/24* | (2006.01) |
| *G06T 11/60* | (2006.01) |

(Continued)

(52) U.S. Cl.
CPC .............. *G08B 21/24* (2013.01); *B60Q 9/00* (2013.01); *B60R 25/241* (2013.01); *B60R 25/245* (2013.01); *G06T 11/60* (2013.01)

(58) Field of Classification Search
CPC ....... G01C 21/343; G01C 21/36; G01S 19/42; G01S 5/0284; G01S 5/14; G06F 21/44; G06F 3/04817; G06K 7/10089; G06K 7/10099; G06K 7/10108; G06K 7/10316; G06K 7/10336; G06K 7/10366; G06K 7/10376; G06K 7/10386; G06K 7/10405; G06Q 10/06; G06Q 10/063; G06Q 10/0631; H04B 5/0031; H04B 5/0056; H04B 5/0062; H04B 7/00; B60R 25/24; B60R 25/245; B60R 25/246; B60R 25/241; G08B 21/24

See application file for complete search history.

(56) References Cited

U.S. PATENT DOCUMENTS

| | | |
|---|---|---|
| 6,529,131 B2 | 3/2003 | Wentworth |
| 7,403,099 B2 | 7/2008 | Kamiya et al. |

(Continued)

FOREIGN PATENT DOCUMENTS

| | | |
|---|---|---|
| DE | 102011053242 A1 | 3/2013 |
| JP | 2007-262792 A | 10/2007 |
| JP | 2008-265562 A | 11/2008 |

*Primary Examiner* — Dionne H Pendleton
(74) *Attorney, Agent, or Firm* — Global IP Counselors, LLP

(57) ABSTRACT

A vehicle keyfob locator system includes a keyfob locator control panel, a display, a plurality of keyfob locator antennas and a controller. The keyfob locator control panel and the display are located within a passenger compartment of a vehicle. The plurality of keyfob locator antennas are installed at predetermined positions of a vehicle body structure of the vehicle. The controller is operably connected to the keyfob locator control panel and each of the keyfob locator antennas. The controller is configured to operate the keyfob locator antennas and determine a location of a keyfob within the vehicle body structure in response to activation of the keyfob locator control panel and further configured to display an approximate location of the keyfob on the display in response to determining the location of the keyfob within the vehicle body structure.

20 Claims, 8 Drawing Sheets

(51) Int. Cl.
*B60Q 9/00* (2006.01)
*B60R 25/24* (2013.01)

(56) References Cited

U.S. PATENT DOCUMENTS

| | | | |
|---|---|---|---|
| 8,150,563 B2 | 4/2012 | Georgi et al. | |
| 8,351,937 B2 | 1/2013 | Lee | |
| 9,255,810 B2* | 2/2016 | Van Wiemeersch | G01C 21/36 |
| 2011/0148573 A1* | 6/2011 | Ghabra | B60R 25/245 340/5.61 |
| 2012/0092129 A1* | 4/2012 | Lickfelt | B60R 25/24 340/5.72 |
| 2012/0221189 A1* | 8/2012 | Konet | G01C 22/006 701/29.1 |
| 2014/0067163 A2 | 3/2014 | Du et al. | |
| 2016/0320469 A1* | 11/2016 | Laifenfeld | G01S 5/14 |
| 2016/0375346 A1* | 12/2016 | Czaja | A63C 11/003 434/253 |

\* cited by examiner

VEHICLE KEYFOB LOCATOR SYSTEM

BACKGROUND

Field of the Invention

The present invention generally relates to a vehicle keyfob locator system. More specifically, the present invention relates to a locator system within a vehicle that searches for and determines at least an approximate location of a vehicle remote control device, such as a keyfob, mis-placed within the vehicle.

Background Information

Many vehicles are produced with features that wirelessly communicate with an electronic keyfob. For example, the vehicle can be configured for keyless starting of the engine such that the engine can be started by pressing a button on the instrument panel, but only in the presence of the keyfob. The keyfob is not physically necessary to start the engine, but merely needs to be located within the vehicle when keylessly starting the engine. The vehicle can also be provided with a system that enables a vehicle operator to remotely start an engine of the vehicle using the keyfob.

The vehicle can also be configured such that the keyfob can be used to remotely lock and unlock the vehicle doors without use of a mechanical key. Such systems can also be configured to prevent the locking of the vehicle when the keyfob is detected as being within the vehicle with the engine not running to prevent a vehicle operator from inadvertently locking the keyfob within the vehicle. However, a problem can occur when the vehicle operator or passenger has mis-placed the keyfob within the vehicle. Specifically, the vehicle can be started even though the vehicle operator is not in direct possession of the keyfob.

SUMMARY

One object of the disclosure is to provide a vehicle with a system configured to assist a passenger or vehicle operator in a locating a mis-placed vehicle keyfob when the keyfob is located somewhere within the vehicle.

Another object of the disclosure is to determine at least an approximate location of a keyfob within a vehicle and display the approximate location of the keyfob on a display on the instrument panel of the vehicle.

In view of the state of the known technology, one aspect of the present disclosure is to provide a vehicle keyfob locator system with a keyfob locator control panel, a display, a plurality of keyfob locator antennas and a controller. The keyfob locator control panel and the display are located within a passenger compartment defined within a vehicle body structure of a vehicle. The plurality of keyfob locator antennas are installed at predetermined positions of the vehicle body structure within the vehicle. The controller is operably connected to the keyfob locator control panel, the display and each of the keyfob locator antennas. The controller is configured to operate the keyfob locator antennas and determine a location of a keyfob within the vehicle body structure in response to activation of the keyfob locator control panel and further configured to display an approximate location of the keyfob on the display in response to determining the location of the keyfob within the vehicle body structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
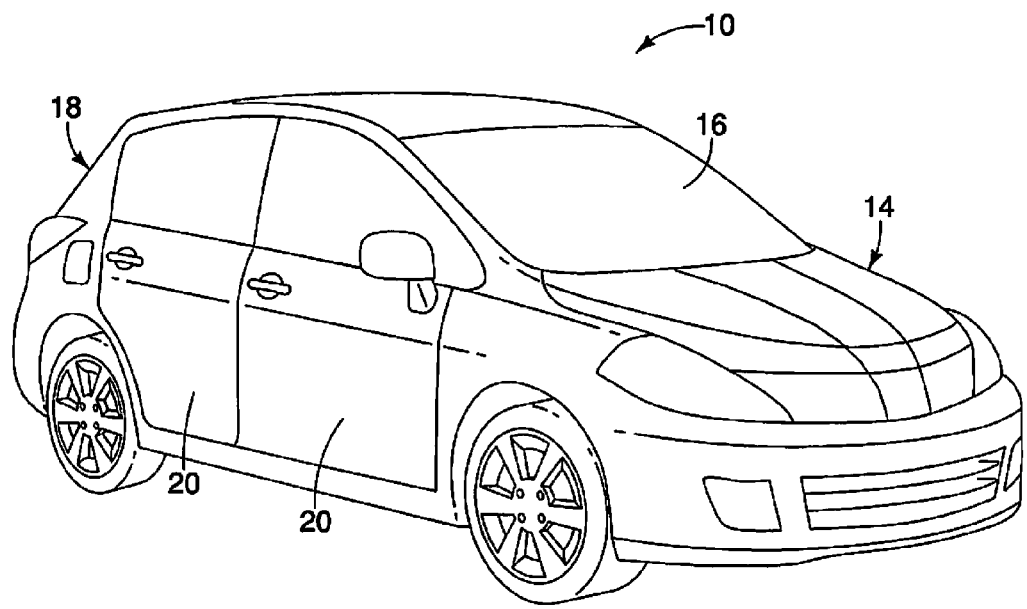
FIG. 1 is a perspective view of a vehicle that includes a keyfob locator system in accordance with a first embodiment.
Figure 2:
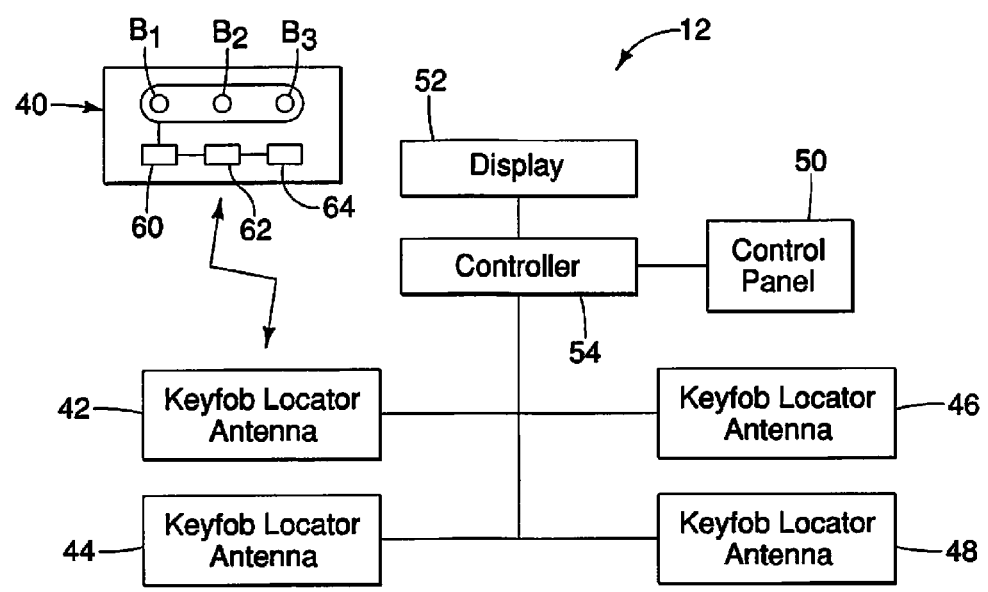
FIG. 2 is a schematic view of the keyfob locator system shown removed from the vehicle in accordance with the first embodiment.

Referring initially to FIGS. 1 and 2, a vehicle 10 that includes a keyfob locator system 12 is illustrated in accordance with a first embodiment.

As shown in FIGS. 1 and 3-6, the vehicle 10 includes a vehicle body structure 14 that defines a passenger compartment 16 and a cargo area or trunk space 18. The vehicle 10 further includes doors 20 and a cargo hatch or trunk lid 22. The passenger compartment 16 includes a floor 24, an instrument panel 26, front seats 28 and rear seats 30.

In the depicted embodiment, the vehicle 10 is a four-door sedan (a passenger vehicle). However it should be understood from the drawings and the description herein, that the vehicle 10 can alternatively be an SUV, a truck, sports car or any other motorized vehicle that includes a passenger compartment. Since vehicles and vehicle body structures are conventional structures, further description is omitted for the sake of brevity.

The trunk space 18 of the vehicle 10 can be defined in a plurality of differing ways, depending upon the type of vehicle. First, the trunk space 18 can be a cargo area behind the rear seats 30 that is open to the passenger compartment 16 (within the vehicle body structure 14). Such an arrangement is common when the vehicle is, for example, a hatchback vehicle, station wagon, van or sports utility vehicle (SUV). Second, the trunk space 18 can be completely separated, isolated and inaccessible from the passenger compartment 16. For example, if the vehicle 10 is a conventional four-door sedan or two-door coupe, the trunk space 18 can be an enclosed space behind the rear seats 30 that is accessed via the trunk lid 22 located at a rear of the vehicle 10. The trunk space 18 that is enclosed can also be configured such that the trunk space 18 can be accessed by movement of the rear seats 30 from an upright orientation to a folded orientation (not shown).

A description of the keyfob locator system 12 is now provided with initial reference to FIG. 2. The keyfob locator system 12 in a first embodiment includes a keyfob 40, a first keyfob locator antenna 42, a second keyfob locator antenna 44, a third keyfob locator antenna 46, a fourth keyfob locator antenna 48, a control panel 50, a display 52 and a controller 54. The vehicle 10 can optionally include an electronic locking system (not shown) that locks and unlocks the doors 20 in response to operation of the keyfob 40. The electronic locking system is also connected to the keyfob locator system 12 and utilizes the first, second, third and fourth keyfob locator antennas 42, 44, 46 and 48 in determining whether or not the keyfob 40 is located within or outside of the vehicle body structure 14. The electronic locking system can further be configured to automatically lock the doors 20 when the vehicle 10 is being operated and is moving above a predetermined speed. Since electronic locking systems are conventional, further description is omitted for the sake of brevity.

The keyfob 40 is a battery powered electronic device that includes a control circuit 60, a signal transmitter 62 and a signal receiver 64. The keyfob 40 also includes a plurality of command buttons, such as, for example, a lock button $B_1$, an unlock button $B_2$ and a panic alarm button $B_3$. The control circuit 60 of the keyfob 40 is configured such that when the lock button $B_1$ is pressed the control circuit operates the signal transmitter 62 to send a signal to the vehicle 10 such that the electronic locking system (not shown) within the vehicle 10 remotely locks all of the doors 20 of the vehicle 10. Similarly, when the unlock button $B_2$ is pressed the control circuit 60 operates the signal transmitter 62 to send a signal to the vehicle 10 such that the electronic locking system within the vehicle 10 unlocks one or more of the doors 20 of the vehicle 10. When the panic alarm button $B_3$ is pressed the control circuit 60 operates the signal transmitter 62 to send a signal to the vehicle 10 such that an alarm system (not shown) within the vehicle 10 causes the horn or other noise producing device to sound, thereby, for example, making it easier to find the vehicle 10 within a parking lot.

The keyfob 40 can alternatively also be provided with an additional button or buttons (not shown) that cause the vehicle 10 to perform other operations such as, for example, remotely starting the engine of the vehicle.

The signal receiver 64 is configured to receive signals transmitted by each of the first through fourth keyfob locator antennas 42, 44, 46 & 48 in a manner described in greater detail below.

The description of the keyfob 40 above, is one of many differing types of keyfob designs and configurations. The keyfob 40 described above can be any one of a plurality of devices also known as Smart Keys, or Intelligent Keys that are configured to at least lock and unlock doors of a vehicle remotely and keylessly. These keyfob designs are produced by many manufactures. The keyfob 40 can be any one of these types of devices. Since such keyfob technology for providing keyless entry into a vehicle is conventional, further description is omitted for the sake of brevity.

It should be understood from the drawings and the description herein, that the location determining feature described herein below is a feature that can be added to any one of the conventional keyless entry keyfobs referred to above, and is not limited to use with any single type of keyfob system or keyfob technology.

Figure 3:
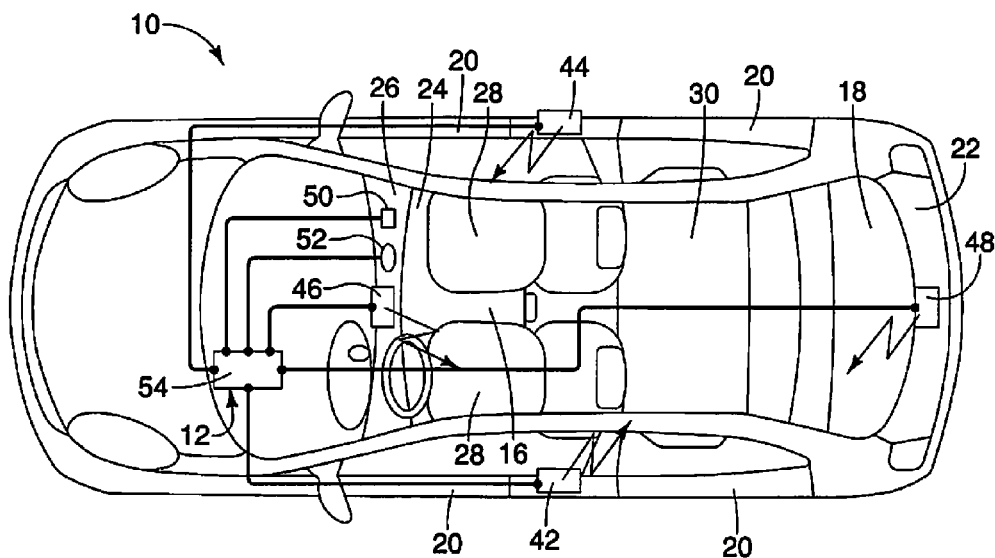
FIG. 3 is a top schematic view of the vehicle depicted in FIG. 1, showing the location of each of the elements of the keyfob locator system shown in FIG. 2 in accordance with the first embodiment.

With reference now to FIG. 3, a further description of the keyfob locator system 12 is now provided. The first keyfob locator antenna 42 is installed along the driver's side of the vehicle body structure 14. The first keyfob locator antenna 42 can be installed within the door 20 (the front door) on the driver's side or can be installed within the B-pillar (not shown) of the vehicle body structure 14. The second keyfob locator antenna 44 is installed along the passenger's side of the vehicle body structure 14. The second keyfob locator antenna 44 can be installed within the door 20 (the front door) on the passenger's side or can be installed within the B-pillar (not shown) of the vehicle body structure 14 of the passenger's side of the vehicle body structure 14.

The third keyfob locator antenna 46 is installed within the vehicle body structure 14, preferably at a front area of the passenger compartment 16. In the depicted embodiment shown in FIG. 3, the third keyfob locator antenna 46 is installed within the instrument panel 26 near or along a longitudinal center of the vehicle 10. The third keyfob locator antenna 46 is preferably located at a level near the bottom of the windscreen (windshield) of the vehicle 10 well above the floor 24 of the passenger compartment 16. The fourth keyfob locator antenna 48 is located at a rear end of the vehicle body structure 14. For example, the fourth keyfob locator antenna 48 can be installed near a locking mechanism (not shown) within the trunk lid 22 or can be fixed to the vehicle body structure 14 near the locking mechanism of the trunk lid 22.

The control panel 50 is installed on a surface of the instrument panel 26 and is positioned to be easily accessed by a vehicle passenger or a vehicle operator. The control panel 50 includes at least one button or switch (not shown)

that activates the keyfob locator system 12 in a manner described in greater detail below.

The display 52 is also installed along a surface of the instrument panel 26 and is positioned to be easily viewed by a vehicle passenger or a vehicle operator. The display 52 can be a multifunctional display that is also operated by a conventional global positioning satellite system (a GPS) and/or operated by a video system connected to cameras located on the vehicle 10 to capture images of areas surrounding the vehicle 10. Since GPS systems and video systems are conventional vehicle systems, further description is omitted for the sake of brevity. It should be understood from the drawings and the description herein that the control panel 50 and the display 52 can be integrated in a single unit or may be separate components depending upon the overall design of the instrument panel 26 and other design criteria. Further, the control panel 50 and the display 52 can be part of or integrated into other systems that are part of the instrument panel 26.

The controller 54 can be installed at any of a variety of convenient locations within the vehicle body structure 14. In the depicted embodiment, the controller 54 is installed within the instrument panel 26 at the front of the passenger compartment 16, adjacent to a steering column (not shown) of the vehicle 10, but can alternatively be installed elsewhere. The controller 54 can be a stand-alone control unit or can be integrated into a conventional body control module that controls, for example, other systems within the vehicle 10, such as HVAC, engine, transmission and/or vehicle body functions or features. The controller 54 can also include a signal receiver (not shown) that is part of the keyfob locator system 12, as described in greater detail below.

As shown in FIGS. 2 and 3, the controller 54 is electronically connected to the first keyfob locator antenna 42, the second keyfob locator antenna 44, the third keyfob locator antenna 46, the fourth keyfob locator antenna 48, the control panel 50 and the display 52. The controller 54 is further configured to communicate with the keyfob 40 via transmissions by the first, second, third and fourth keyfob locator antennas 42, 44, 46 and 48 and signals received by a receiver (not shown) within the controller 54 or signals received from the keyfob 40 via the first, second, third and fourth keyfob locator antennas 42, 44, 46 and 48.

There are many different possible ways for the keyfob 40 and the controller 54 to communicate with one another in determining the location of the keyfob 40. For example, the controller 54 can be configured to transmit signals from each of the first, second, third and fourth keyfob locator antennas 42, 44, 46 and 48 sequentially with specific timing intervals. The keyfob 40 can be similarly configured to transmit its own signal (for example, an encryption key) in response to detection of each of the signals received from the first, second, third and fourth keyfob locator antennas 42, 44, 46 and 48. As mentioned above, the controller 54 can include a signal receiver that receives signals broadcast by the keyfob 40. Alternatively, a separate signal receiver (not shown) can be installed within the vehicle 10 and connected to the controller 54.

Since the keyfob 40 is a small battery powered unit (battery not shown), the signals transmitted from the signal transmitter 62 of the keyfob 40 are relatively weak and reception by the keyfob 40 of the signals from each of the first, second, third and fourth keyfob locator antennas 42, 44, 46 and 48 is similarly weak. Further, the first, second, third and fourth keyfob locator antennas 42, 44, 46 and 48 are tuned to broadcast signals that are similarly weak such that the keyfob 40 must be no further than a predetermined distance away in order to receive signals therefrom. In effect, each of the first, second, third and fourth keyfob locator antennas 42, 44, 46 and 48 defines its own bubble and the keyfob 40 must be within that imaginary bubble in order to receive signals broadcast therefrom.

More specifically, the keyfob 40 will broadcast its corresponding signal in response to a received signal only if the keyfob 40 is within range of the broadcasting antenna. The keyfob 40 must be less than a predetermined distance from the broadcasting antennas in order to receive its signal. This predetermined distance can be a foot or two feet, depending upon the tuning of the keyfob 40 and the first, second, third and fourth keyfob locator antennas 42, 44, 46 and 48. The controller 54 is configured to correlate the signals from the keyfob 40 with the signals broadcasted by each of the first, second, third and fourth keyfob locator antennas 42, 44, 46 and 48. Put another way, if there is no signal from the keyfob 40 corresponding a signal broadcast from the antenna 42, then the keyfob 40 is not close enough to the antenna 42 to receive its signal. If the keyfob 40 does send a signal in response to receipt of a signal from one of the antennas, then the keyfob 40 is within range of that specific antenna. The controller 54 determines of whether or not a signal is received from the keyfob 40 corresponds to specific ones of the first, second, third and fourth keyfob locator antennas 42, 44, 46 and 48. Thereafter, the controller 54 determines the approximate location of the keyfob 40 within the vehicle 10. Since the first, second, third and fourth keyfob locator antennas 42, 44, 46 and 48 are located at predetermined positions within the vehicle body structure 14 of the vehicle 10, the correlation of the received signals from the keyfob 40 with signals broadcast from each of the first, second, third and fourth keyfob locator antennas 42, 44, 46 and 48 provides a means for determining the location of the keyfob 40. Further, if the keyfob 40 is within a bubble defined by a specific antenna but has weak reception therefrom, the keyfob 40 can produce a weaker broadcasted signal whose strength can be determined by the controller 54.

However, it should be understood from the drawings and the disclosure herein that any of a variety of transmission/reception protocols and schemes can be used by the controller 54 in its communications with the keyfob 40. Such protocols and schemes are conventional with respect to keyfob communications exterior to the vehicle with respect to the electronic locking systems for door locks, as mentioned above. The keyfob locator system 12 described herein can be employed with many differing types of conventional communication protocols and schemes, and is not limited that described herein.

Figure 4:
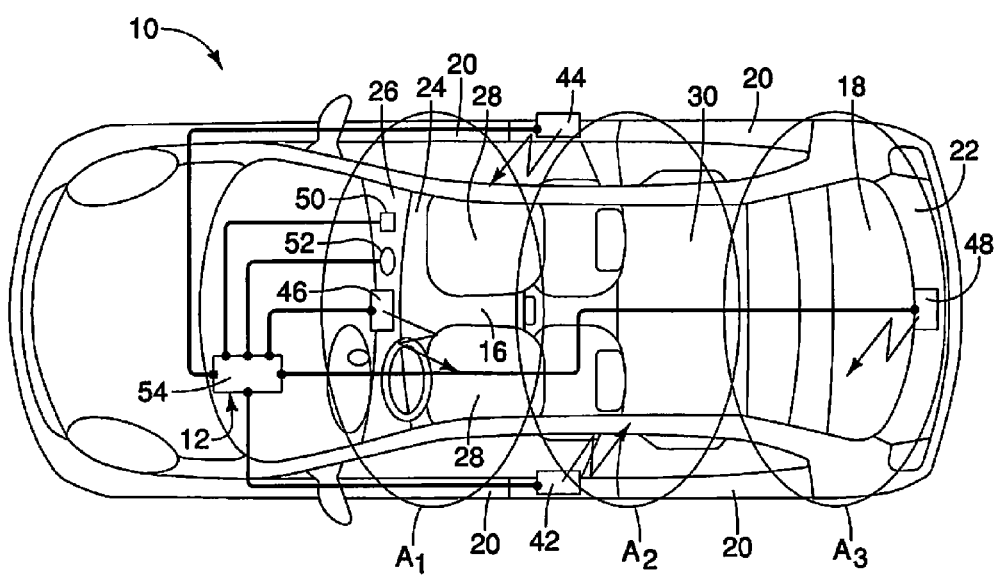
FIG. 4 is another top schematic view of the vehicle similar to FIG. 3, showing three zones of an interior of the vehicle as defined by the keyfob locator system, including a first zone, a second zone and a third zone defined within a passenger compartment and a cargo area of the vehicle in accordance with the first embodiment.
Figure 5:
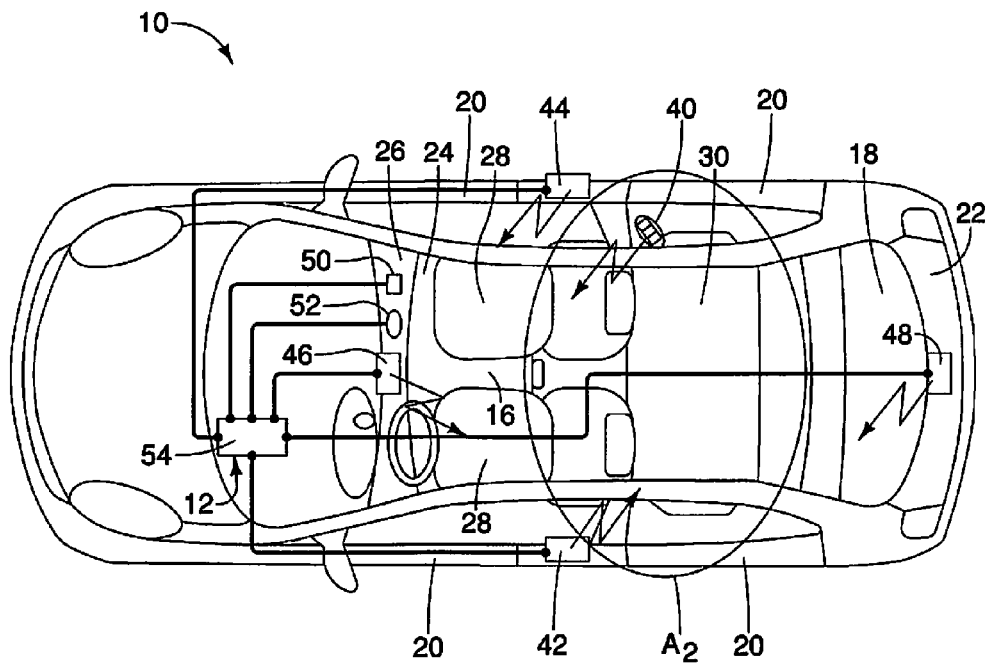
FIG. 5 is another top schematic view of the vehicle similar to FIGS. 3 and 4, showing results of a search by the keyfob locator system identifying a location of a keyfob as being within the second zone of the vehicle, in accordance with the first embodiment.
Figure 6:
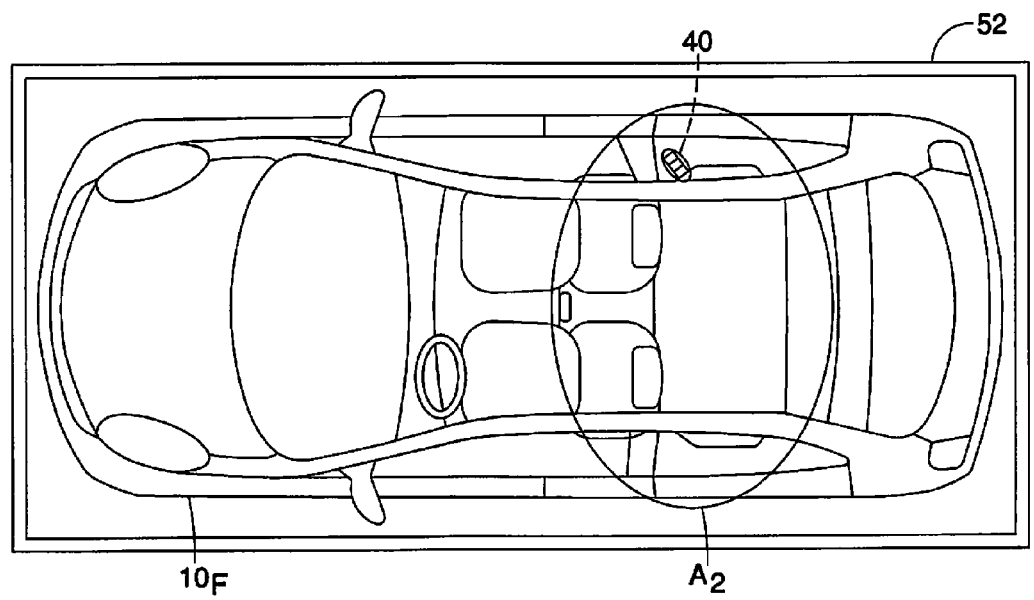
FIG. 6 is a representation of a display of the keyfob locator system showing a vehicle with a keyfob superimposed over the vehicle according to an approximate location of the keyfob within the second zone in accordance with the first embodiment.
Figure 7:
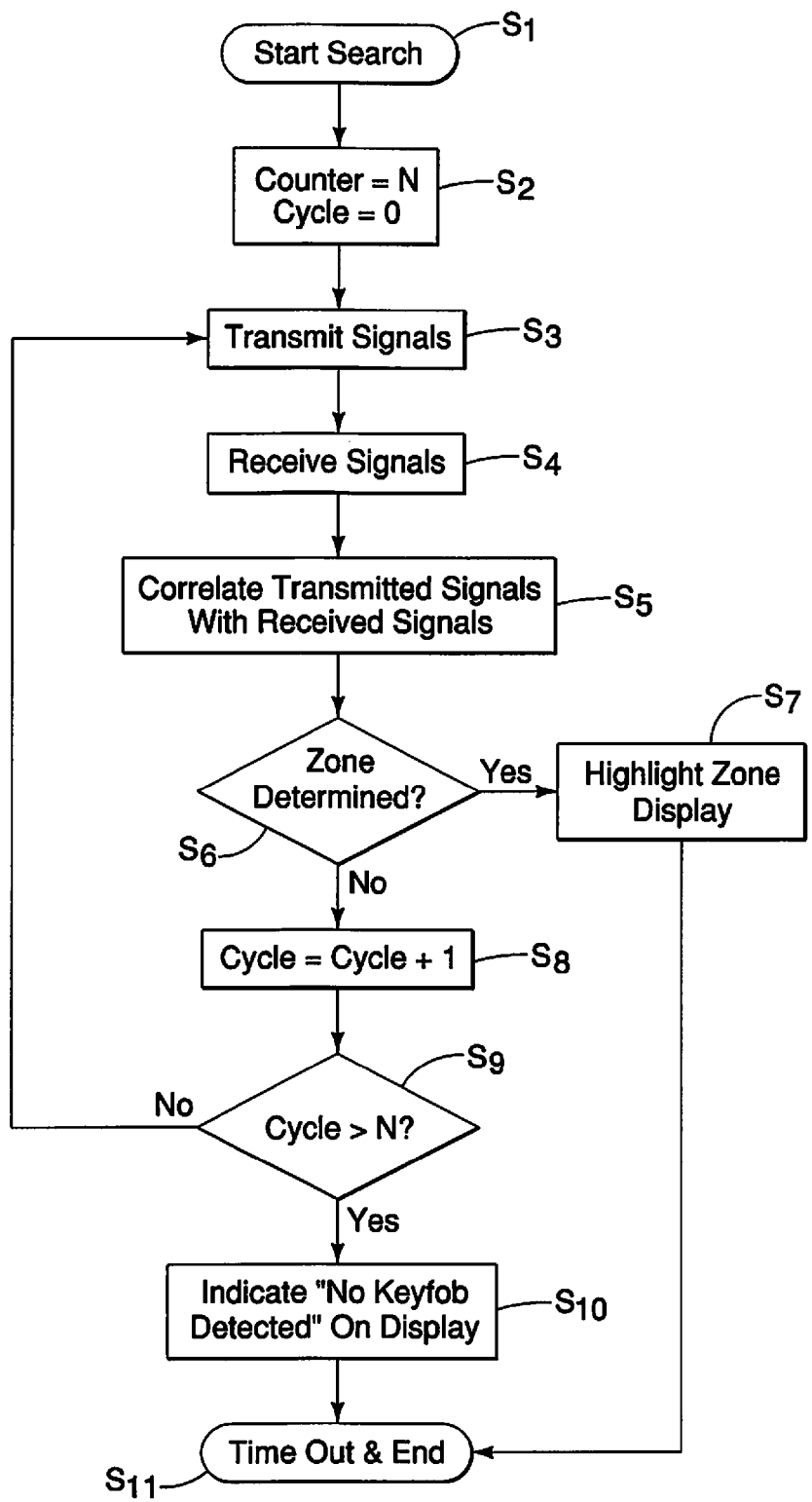
FIG. 7 is a flowchart showing an example of basic logic conducted by the keyfob locator system of the vehicle in accordance with the first embodiment.

A description of the keyfob locator system 12 is now provided with specific reference to FIGS. 4-6 and the flowchart depicted in FIG. 7.

The keyfob locator system 12 basically operates as follows. First, when a passenger or vehicle operator needs to find a mis-placed keyfob 40, the passenger or vehicle operator presses a button or other activating device on the control panel 50 on the instrument panel 26 causing the controller 54 to activate the keyfob locator system 12. Thereafter, the controller 54 begins to operate the first, second, third and fourth keyfob locator antennas 42, 44, 46 and 48, causing them to transmit signals to the keyfob 40 in a predetermined sequence. In response to receipt of the signals from the first, second, third and fourth keyfob locator antennas 42, 44, 46 and 48, the keyfob 40 begins transmitting its own signals in response to the sequenced transmissions from ones of the first, second, third and fourth keyfob locator antennas 42, 44, 46 and 48 that are within range of the keyfob 40. The controller 54 processes data received from the keyfob 40 and determines the proximity of the keyfob 40 relative to each of the first, second, third and fourth keyfob locator antennas 42, 44, 46 and 48.

In the depicted embodiment, the vehicle body structure 14 is subdivided into three zones, zone $A_1$, zone $A_2$ and zone $A_3$, as shown in FIG. 4. Zone $A_1$ includes an area of the passenger compartment 16 extending from the instrument panel 26 to a rear section of the front seats 28. The zone $A_2$ includes an area of the passenger compartment 16 extending from the rear section of the front seats 28 to a rear section of the rear seats 30. The zone $A_3$ includes an area rearward of the rear seats 30 and includes the cargo area or trunk space 18.

Using the data corresponding to the signals received from the keyfob 40, the controller 54 can determine the approximate location of the keyfob 40 by evaluating the relative presence, absence and strength of each of the signals transmitted by the keyfob 40. For example, if the signals from the keyfob 40 were received corresponding to signals from both the first and second keyfob locator antennas 42 and 44, then the controller 54 determines that the keyfob 40 is located somewhere within the vehicle body structure 14.

Next, the controller 54 evaluates the presence, absence and/or strength of the signals from the keyfob 40 corresponding to transmissions from the third keyfob locator antenna 46. If there are signals from the keyfob 40 corresponding to signals broadcast by the third keyfob locator antenna 46, then the keyfob 40 is located within the zone $A_1$ (the front of the passenger compartment 16). If no signals or weak signals were received from the keyfob 40 corresponding to the signals by the third keyfob locator antennas 46, then the keyfob 40 is not located within the zone $A_1$ (the front of the passenger compartment 16).

Next, the controller 54 evaluates the presence, absence and/or strength of the signals received from the keyfob 40 corresponding to signals broadcast by the fourth keyfob locator antenna 48. If signals were received from the keyfob 40 then the keyfob 40 is located within the zone $A_3$ (the cargo area or trunk space 18). If no signals were received or if the signal strength was weak from the keyfob 40 corresponding to signals from the fourth keyfob locator antenna 48, then the keyfob 40 is not located within the zone $A_1$ or zone $A_3$, and therefore is located within the area of the rear seats 30 (i.e, the zone $A_2$).

Once the controller 54 has determined that the keyfob 40 is located within the zone $A_2$ as shown in FIG. 5, the controller 54 displays a faux image $10_F$ of the vehicle 10 on the display 52, with an indication that the keyfob 40 is located within the zone $A_2$, as shown in FIG. 6.

In the first embodiment, the controller 54 and the keyfob locator system 12 are configured to divide the vehicle body structure 14 into a plurality of differing areas. Specifically, the controller 54 divides the vehicle body structure 14 into the zones $A_1$, $A_2$ and $A_3$ thereby providing a passenger or a vehicle operator with an approximate location of the keyfob 40 within the vehicle 10.

A description of basic logic used by the controller 54 is now provided with specific reference to FIG. 7. At step S1, the controller 54 responds to input from the control panel 50. Specifically, the control panel 50 has been manually operated by a passenger or vehicle operator requesting that the controller 54 assist in locating a mis-placed keyfob 40. At step S2, the controller 54 sets a counter N as being equal to a predetermined number N that serves to limit the duration of the search for the mis-placed keyfob 40. Also at step S2, a variable Cycle is made equal to 0. The counter N is provided in order to prevent the controller 54 from endlessly searching for the keyfob 40, and sets a time limit to the search. In one embodiment, the searching time of the controller 54 is limited to 30 seconds. However, any duration can be programmed or otherwise pre-set into the controller 54.

At step S3, the controller 54 causes the first, second, third and fourth keyfob locator antennas 42, 44, 46 and 48 to begin transmitting signals to the keyfob 40. If the keyfob 40 is within reception range (or within the vehicle body structure 14), the keyfob 40 responds by transmitting its own signals.

At step S4, the controller 54 receives any signals from the keyfob 40 corresponding to the signals transmitted by the first, second, third and fourth keyfob locator antennas 42, 44, 46 and 48. The controller 54 evaluates the signals received (and the signals not received) from the keyfob 40.

At step S5, the controller 54 compares the signals transmitted by the first, second, third and fourth keyfob locator antennas 42, 44, 46 and 48 with the signals received from the keyfob 40. Specifically at step S5, the controller 54 determines the strength of the signals received from the keyfob 40 relative to the signals transmitted by the first, second, third and fourth keyfob locator antennas 42, 44, 46 and 48 in order to determine the approximate location of the keyfob 40 relative to each of the first, second, third and fourth keyfob locator antennas 42, 44, 46 and 48. The controller 54 first determines whether or not the keyfob 40 is located within the vehicle 10 and then evaluates the strength of the signals received from the keyfob 40.

At step S6, the controller 54 determines whether or not the keyfob 40 is located within one of the zones $A_1$, $A_2$ and $A_3$. If the keyfob 40 is located within one of the three zones $A_1$, $A_2$ and $A_3$, then the controller 54 moves to step S7 and provides an indication on the display 52 as to the zone in which the keyfob 40 is located. In FIG. 6, the keyfob 40 is indicated as being located within the zone $A_2$.

Specifically, the display 52 is configured to display the faux image $10_F$ of the vehicle 10. The faux image $10_F$ is a simulated overhead view of the vehicle 10. Once the approximate location of the keyfob 40 has been determined by the controller 54, the determined location of the keyfob 40 is overlaid on the simulated overhead view (the faux image $10_F$) of the vehicle 10 on the display. In FIG. 6 the keyfob 40 is depicted as being located in zone $A_2$. However, the display 52 can also display the keyfob 40 as being located in either of the zones $A_1$ and $A_3$, if the controller 54 had determined the location as being either of the zones $A_1$ and $A_3$.

Once the controller 54 has operated the display 52 to display the approximate location of the keyfob 40 relative to the faux view $10_F$, operation moves to step S11 where the operation of the keyfob locator system 12 is ended.

At step S6, if the controller 54 has not determined the location of the keyfob 40, operation moves to step S8 where the variable Cycle is incremented. At step S9 the controller determines whether or not Cycle is greater than the variable N. If Cycle is not greater than N, then operations return to step S3 and cycle through steps S4 to step S8. At step S9, if Cycle is greater than N, then operations move to step S10. Next, at step S10, the controller 54 has exhausted the search cycling time determined by the value of N and causes the display 52 to provide an indication that the keyfob 40 has not been detected within the vehicle body structure 14 of the vehicle 10. Next, operation moves to step S11 where the programming ceases and times out.

Second Embodiment

Referring now to FIGS. 8-13, a keyfob locator system 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 9:
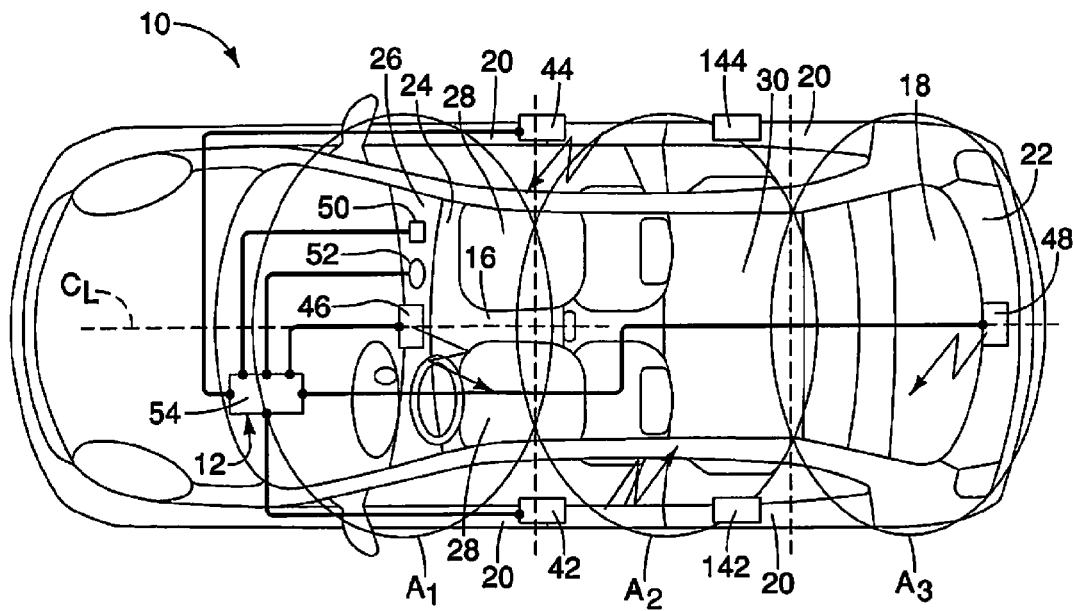
FIG. 9 is a top schematic view of the vehicle showing the location of each of the elements of the keyfob locator system shown in FIG. 8 and showing the first three of seven zones within an interior of the vehicle as defined by the keyfob locator system, including a first zone, a second zone and a third zone in accordance with the second embodiment.
Figure 10:
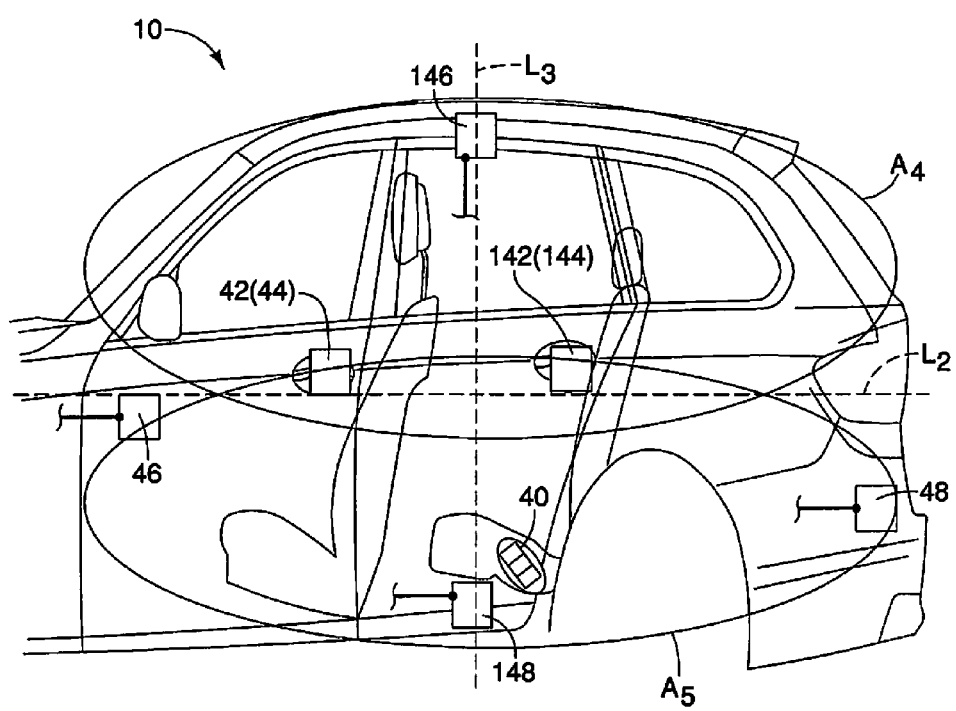
FIG. 10 is a side schematic view of the vehicle showing fourth and fifth zones as defined by the keyfob locator system, the fourth zone being defined as an upper area of the passenger compartment and the fifth zone being defined as a lower area of the passenger compartment in accordance with the second embodiment.
Figure 11:
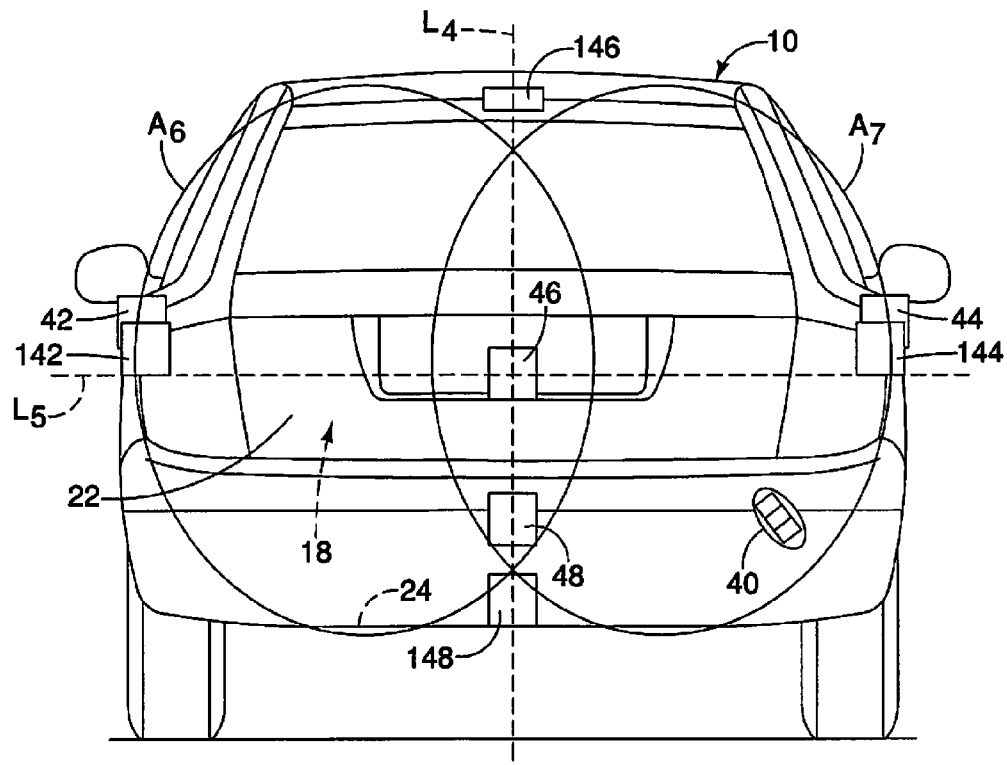
FIG. 11 is a rear schematic view of the vehicle showing sixth and seventh zones as defined by the keyfob locator system, the sixth and seventh zones being approximately divided along a longitudinal center line of the vehicle such that the sixth zone is defined as a driver's side area of the passenger compartment and the seventh zone is defined as a passenger side area of the passenger compartment in accordance with the second embodiment.

The keyfob locator system 112 in accordance with the second embodiment includes all of the features and elements of the keyfob locator system 12 of the first embodiment, but includes additional elements in order to provide a more precise determination of a location of a mis-placed keyfob. Specifically, the keyfob locator system 112 includes the keyfob 40, the first keyfob locator antenna 42, the second keyfob locator antenna 44, the third keyfob locator antenna 46, the fourth keyfob locator antenna 48, the control panel 50, the display 52 and the controller 54 as described above with respect to the first embodiment. However, in the second embodiment, as shown in FIGS. 9-11, the keyfob locator system 112 further includes a fifth keyfob locator antenna 142, a sixth keyfob locator antenna 144, a seventh keyfob locator antenna 146 and an eighth keyfob locator antenna 148.

The fifth keyfob locator antenna 142 is installed to one of the doors 20 at the rear of the driver's side of the vehicle 10, or is installed within or adjacent to a C-pillar (not shown) at the rear of the driver's side of the vehicle 10. The sixth keyfob locator antenna 144 is installed to one of the doors 20 at the rear of the passenger's side of the vehicle 10, or is installed within or adjacent to a C-pillar (not shown) at the rear of the passenger's side of the vehicle 10. As shown in FIGS. 10 and 11, the seventh keyfob locator antenna 146 is installed along a roof panel and is centered within the vehicle 10. The eighth keyfob locator antenna 148 is installed along the floor 24 and is centered within the vehicle 10.

Figure 8:
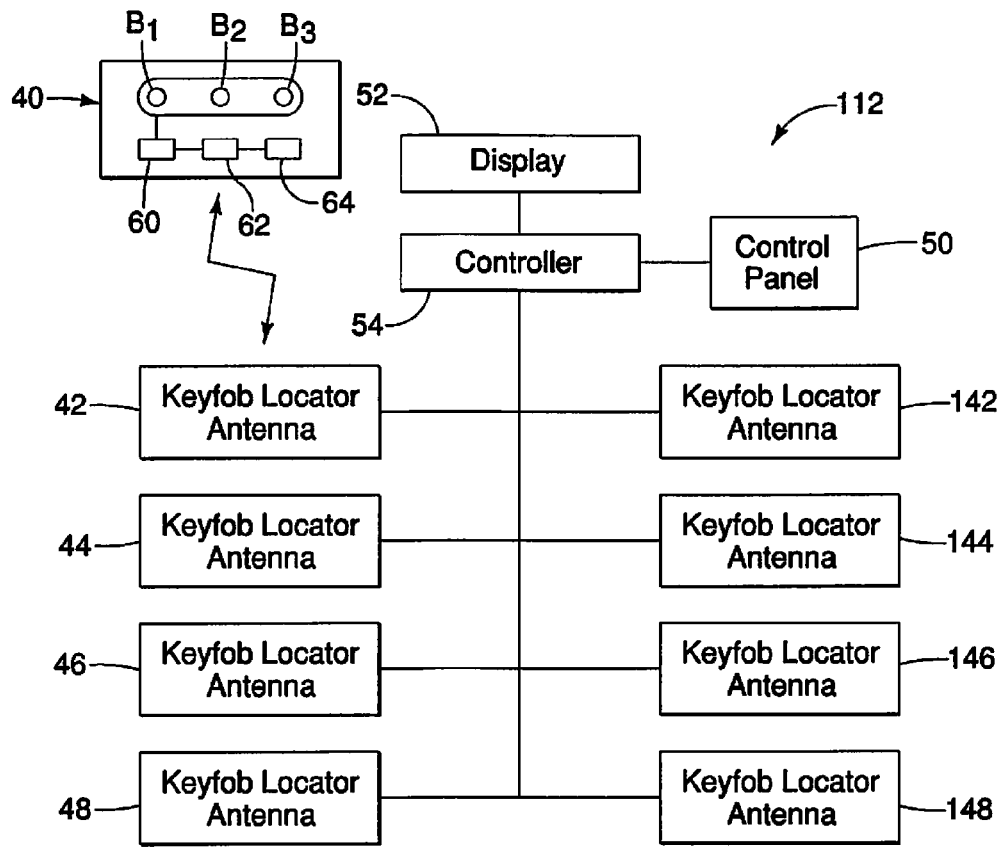
FIG. 8 is a schematic view of a keyfob locator system of the vehicle in accordance with a second embodiment.

In the second embodiment as shown in FIG. 8, the controller 54 is electronically connected to the first keyfob locator antenna 42, the second keyfob locator antenna 44, the third keyfob locator antenna 46, the fourth keyfob locator antenna 48, the control panel 50, the display 52, the fifth keyfob locator antenna 142, the sixth keyfob locator antenna 144, the seventh keyfob locator antenna 146 and the eighth keyfob locator antenna 148. The controller 54 is further configured to receive transmissions from the keyfob 40 via the receive (not shown) where the keyfob 40 transmits in response to receiving sequential transmissions from the first through eighth keyfob locator antennas 42, 44, 46, 48, 142, 144, 146 and 146.

In the first embodiment, the interior of the vehicle body structure 14 (including the passenger compartment 16 and the cargo area or trunk space 18) was divided by the keyfob locator system 12 into three zones $A_1$, $A_2$ and $A_3$. In the second embodiment, the vehicle 10 is divided into several additional zones in order to provide the vehicle operator or passenger with more specific information regarding the location of a mis-placed keyfob. In the second embodiment, the keyfob locator system 112 defines the three zones $A_1$, $A_2$ and $A_3$ as shown in FIG. 9 and described above with respect to the first embodiment. However, in the second embodiment the keyfob locator system 112 further defines additional zones, as described below. These additional zones further divide the interior of the vehicle body structure 14 into different areas. For example, as shown in FIG. 10, a line $L_2$ extends in a vehicle longitudinal direction and is approximately vertically centered relative to an overall volume of the interior of the vehicle body structure 14. Similarly, in FIG. 11, a line $L_5$ extends laterally across the vehicle body structure 14. The lines $L_2$ and $L_5$ define a plane that divides the interior of the vehicle body structure 14 into an upper zone $A_4$ and a lower zone $A_5$ that are shown in FIG. 10 and described in greater detail below.

As shown in FIG. 9, an imaginary center line $C_L$ divides the interior of the vehicle body structure 14 into a passenger's side area and a driver's side area referred to herein below as a driver's zone $A_6$ and a passenger's side zone $A_7$, as shown in FIG. 11. More specifically, the driver's zone $A_6$ and the passenger's side zone $A_7$ are approximately defined on either side of a line $L_4$ shown in FIG. 11.

The additional zones $A_4$, $A_5$, $A_6$ and $A_7$ depicted in the drawings are approximate representations and can differ in size and shape from vehicle to vehicle. The additional zones $A_4$, $A_5$, $A_6$ and $A_7$ are defined by the placement and fine tuning of the fifth keyfob locator antenna 142, the sixth keyfob locator antenna 144, the seventh keyfob locator antenna 146 and the eighth keyfob locator antenna 148. The controller 54 uses the signals transmitted from each of these antennas and received by the controller 54 to further divide the vehicle body structure 14 into the additional zones.

With the inclusion of the fifth keyfob locator antenna 142 and the sixth keyfob locator antenna 144 of the keyfob locator system 112, the controller 54 can process signals received from the keyfob 40 to more precisely determine which of the three zones $A_1$, $A_2$ or $A_3$ the keyfob 40 may be located in with respect to a longitudinal direction (forward-rearward direction), with zone $A_1$ being a forward-most zone, the zone $A_2$ being a middle zone (back seat area) and the zone $A_3$ being a rearward zone corresponding to the cargo area or trunk space 18 of the vehicle 10. Further, the vehicle body structure 14 could additionally be divided into at least one additional middle area between the zone $A_2$ and the zone $A_3$ in the event that three rows of seats are provided within the vehicle 10.

Further, with the inclusion of the seventh keyfob locator antenna 146 and the eighth keyfob locator antenna 148, it is possible to detect an approximate vertical location of a mis-placed keyfob. Specifically as shown in FIG. 10, by measuring the presence, absence and strength of signals transmitted by the keyfob 40, the controller 54 can determine the proximity of the keyfob 40 relative to the seventh keyfob locator antenna 146 and the eighth keyfob locator antenna 148. By making such an evaluation, the controller 54 can determine whether or not the keyfob 40 is within upper zone $A_4$ or within located lower zone $A_5$.

As well, using the presence, absence and/or strength of received signals from the keyfob 40, the vehicle body structure 14 can be divided into the driver's side zone $A_6$ and the passenger's side zone $A_7$, as shown in FIG. 11. Specifically, the presence, absence and/or strength of signals received from the keyfob 40 by the controller 54 corresponding to signals sent by the first and/or the fifth keyfob locator antennas 42 and 142, and the second and/or sixth keyfob locator antennas 44 and 144, can be used by the controller 54 to determine whether or not the keyfob 40 is within the driver's side zone $A_6$, or within the passenger's side zone $A_7$.

Using location determining schemes with seven different zones defined by the keyfob locator system 112, the controller 54 can determine an approximate location of a mis-placed keyfob with greater accuracy. When the control panel 50 is manually operated by a passenger or vehicle operator to request a search for a mis-placed keyfob, the controller 54 processes signals received from the keyfob 40 and determines the location of the mis-placed keyfob within the appropriate ones of the seven zones.

Figure 12:
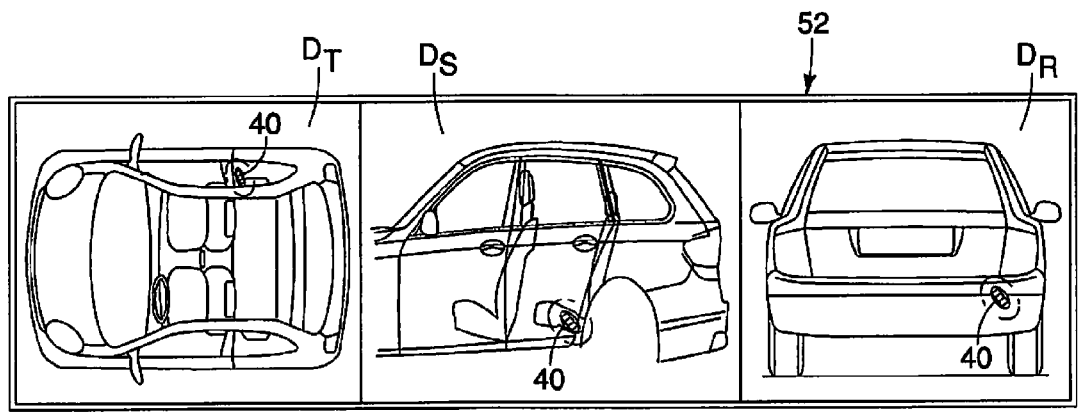
FIG. 12 is a representation of a display of the keyfob locator system showing three different faux views of the vehicle: a top view, a side view and a rear view of the vehicle, with a representation of the keyfob superimposed on each faux view of the vehicle thereby showing an approximate location of the keyfob in three orthogonal views of the vehicle in accordance with the second embodiment.

As shown in FIG. 12, once the controller 54 has processed and analyzed signals received from the keyfob 40, the controller 54 operates the display 52 on the instrument panel 26 and displays three separate images $D_T$ (a simulated top view), $D_S$ (a simulated side view) and $D_R$ (a simulated rear view). Each of the images $D_T$, $D_S$ and $D_R$ includes a faux image of the vehicle with a faux image of the keyfob 40 superimposed in a location corresponding to the location of the keyfob 40 as determined by the controller 54 in accordance with the second embodiment. Specifically, in the image $D_T$ shown on the display 52, the keyfob 40 is depicted as being located in the second zone $A_2$ (the area of the passenger compartment 16 that includes the rear seat 30). In the image $D_S$ shown on the display 52, the keyfob 40 is depicted as being located in the fifth zone $A_5$ (the lower area of the passenger compartment 16). In the image $D_R$ shown on the display 52, the keyfob 40 is depicted as being located in the seventh zone $A_7$ (the passenger's side area of the passenger compartment 16). By looking at the images $D_T$, $D_S$ and $D_R$, the passenger and/or the vehicle operator can more quickly and more easily find the mis-placed keyfob.

Figure 13:
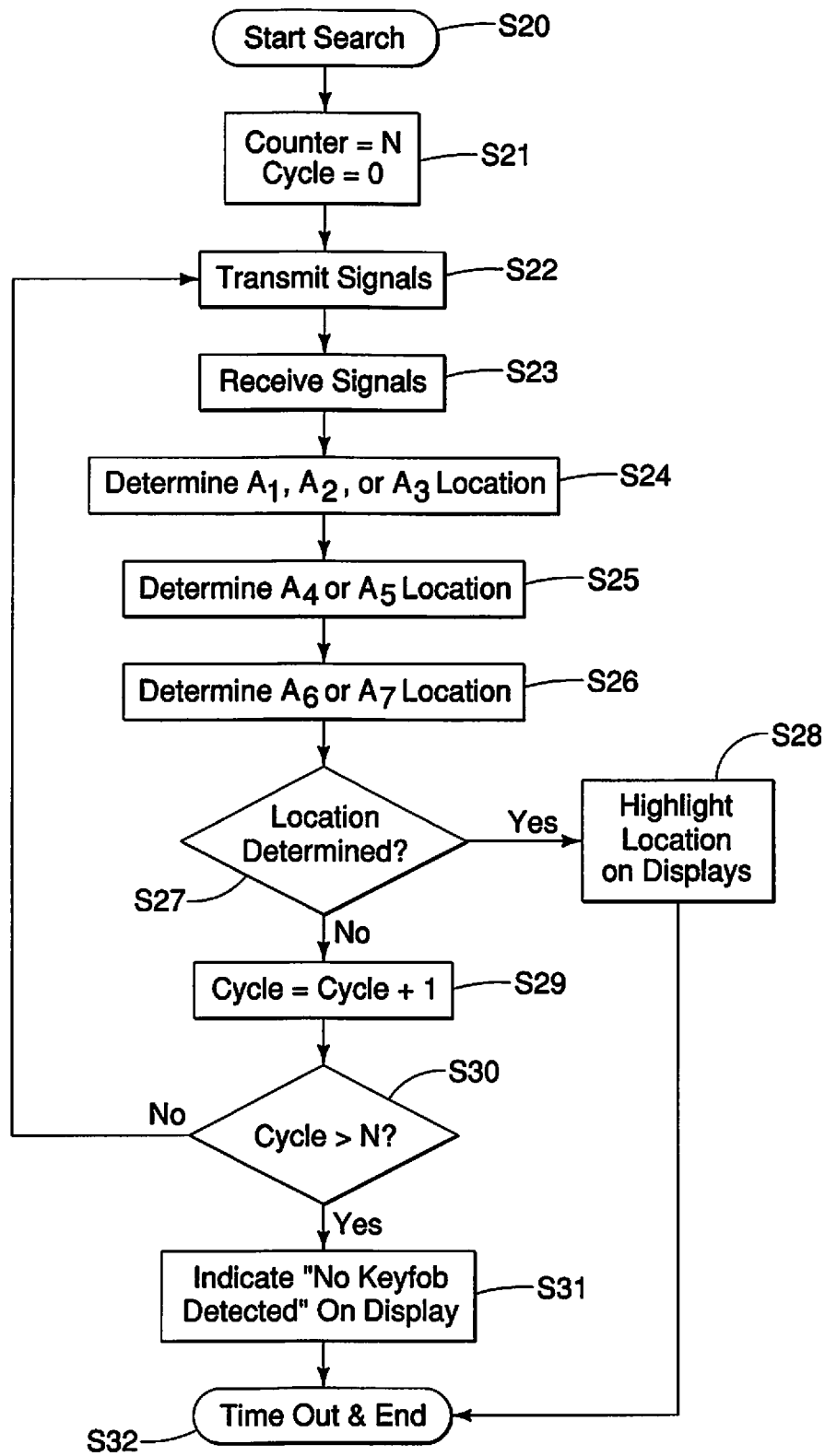
FIG. 13 is a flowchart showing an example of basic logic conducted by the keyfob locator system of the vehicle in accordance with the second embodiment.

A description of basic logic used by the controller 54 in accordance with the second embodiment is now provided with specific reference to FIG. 13. At step S20, the controller 54 responds to input from the control panel 50. Specifically, the control panel 50 has been manually operated by a passenger or vehicle operator requesting that the controller 54 assist in locating a mis-placed keyfob. At step S21, the controller 54 sets a counter N as being equal to a predetermined number N that serves to limit the duration of the search for the mis-placed keyfob. Also at step S21, a variable Cycle is made equal to 0. The counter N is provided in order to prevent the controller 54 from endlessly searching for the keyfob 40, and sets a time limit to the search. In one embodiment, the searching time of the controller 54 is limited to 30 seconds. However, any duration can be programmed or otherwise pre-set into the controller 54.

At step S22, the controller 54 causes the first, second, third, fourth, fifth, sixth, seventh and eighth keyfob locator antennas 42, 44, 46, 48, 142, 144, 146 and 148 to begin transmitting signals to the keyfob 40. If the keyfob 40 is within reception range (or within the vehicle body structure 14), the keyfob 40 responds by transmitting its own signals.

At step S23, the controller 54 receives the signals transmitted by the keyfob 40 and correlates them to sequence of the signals transmitted by the keyfob locator antennas 42, 44, 46, 48, 142, 144, 146 and 148. The controller 54 evaluates whether or not corresponding signals were transmitted by the keyfob 40 corresponding to each signal transmitted by the keyfob locator antennas 42, 44, 46, 48, 142, 144, 146 and 148 and the strength of such signals. The absence of signals transmitted by the keyfob 40 corresponding to a specific one of the antennas, as described in the first embodiment, indicates that the keyfob 40 is not located within range of the corresponding antenna and is therefore not near that antenna. An indication of a weak signal from the keyfob 40 corresponding to a specific one of the antennas, indicates that the keyfob 40 is barely located within range of the corresponding antenna but is space apart therefrom. At step S24, the controller 54 analyzes the signals transmitted by the keyfob locator antennas 42, 44, 46, 48, 142 and 144 with the signals received from the keyfob 40 and determines in which of the first three zones $A_1$, $A_2$ or $A_3$ the mis-placed keyfob 40 is located.

At step S25, the controller 54 analyzes the signals transmitted by the keyfob locator antennas 146 and 148 with the signals received from the keyfob 40 and determines whether the mis-placed keyfob is within the upper zone $A_4$, or within the lower zone $A_5$ of the vehicle 10.

At step S26, the controller 54 analyzes the signals transmitted by the keyfob locator antennas 42, 44, 142 and 144 with the signals received from the keyfob 40 and determines whether the mis-placed keyfob is within the driver's side zone $A_6$, or within the passenger's side zone $A_7$ of the vehicle 10.

As step S27, the controller 54 determines whether or not the keyfob 40 is located within the vehicle 10 and if the keyfob 40 is located within the vehicle, the controller 54 confirms whether or not the keyfob 40 has been located relative to the three corresponding zones determined in steps S24, S25 and S26. If the controller 54 determines that the approximate location of the keyfob 40 has been determined, operation moves to step S28. If the location of the keyfob 40 has not been determined, operation moves to step S29.

In step S28, the controller 54 operates the display 52 showing the simulated top view $D_T$, the simulated side view $D_S$ and the simulated rear view $D_R$. The controller 54 further shows the areas of the vehicle 10 where the keyfob 40 has been located. In FIG. 12, the keyfob 40 is indicated as being located within the zone $A_2$ in the simulated top view $D_T$, in zone $A_5$ in the simulated side view $D_S$ and in zone $A_7$ in the simulated rear view $D_R$.

Once the controller 54 has operated the display 52 to display the approximate location of the keyfob 40 relative to the three simulated views of the vehicle 10, operation moves to step S32 where the operation of the keyfob locator system 12 is ended.

At step S29, the variable Cycle is incremented. At step S30 the controller 54 determines whether or not Cycle is greater than the variable N. If Cycle is not greater than N, then operations return to step S22 and cycle through step S22 to step S27. At step S30, if Cycle is greater than N, then operations move to step S31. At step S31, the controller 54 has exhausted the search cycling time determined by the value of N and causes the display 52 to provide an indication that the keyfob 40 has not been detected within the vehicle body structure 14 of the vehicle 10. Next operation moves to step S32 where the programming ceases and times out.

The controller 54 preferably includes a microcomputer with a keyfob locating control program that controls the keyfob locator system 12. The controller 54 can also include other conventional components such as an input interface circuit, an output interface circuit, and storage devices such as a ROM (Read Only Memory) device and a RAM (Random Access Memory) device. The microcomputer of the controller 54 is programmed to control the keyfob locator system 12, such as the various keyfob locator antennas, the control panel 50 and the display 52. The memory circuit stores processing results and control programs such as ones for keyfob locating operations that are run by the processor circuit. The controller 54 is operatively (and electrically) coupled to the various elements of the keyfob locator system 12 in a conventional manner. The internal RAM of the controller 54 stores statuses of operational flags and various control data. It will be apparent to those skilled in the art from this disclosure that the precise structure and algorithms for the controller 54 can be any combination of hardware and software that will carry out the functions of the present invention.

Alternatively, the keyfob 40 in the above embodiments can be replaced with any of a variety of hand held devices such as a mobile phone, personal digital assistant or smart phone. Specifically, it is possible to program a smart phone to perform the functions of a vehicle keyfob such as the keyfob 40. The smart phone can be programmed to cause the keyfob locator system 12 to function locating a mis-placed keyfob. Alternatively, the keyfob locator system 12 can be used to locate the smart phone if mis-place within the vehicle 10.

Further, the keyfob locator system 12 described above can also be used to locate a mis-placed keyfob when that keyfob is mis-placed outside the vehicle 10, but within a distance wherein the mis-placed keyfob can receive signals broadcast by one or more of the keyfob locator antennas.

Various vehicle elements and vehicle structures are conventional components that are well known in the art. Since such conventional vehicle elements and structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the keyfob locator system 12. Accordingly, these terms, as utilized to describe the present invention should be interpreted relative to a vehicle equipped with the keyfob locator system 12.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle keyfob locator system comprising:
a keyfob locator control panel and a display located within a vehicle, the display being configured to display at least a first zone and a second zone defined within the vehicle, each of the first zone and the second zone corresponding to different areas within the vehicle;
a plurality of keyfob locator antennas installed at predetermined positions of a vehicle body structure of the vehicle;
a controller operably connected to the keyfob locator control panel, the display and each of the keyfob locator antennas, the controller being configured to operate the keyfob locator antennas and determine a location of a keyfob within the vehicle body structure in response to activation of the keyfob locator control panel and further configured to display an approximate location of the keyfob on the display within one of the first zone and the second zone in response to determining that the keyfob is located within the one of the first zone and the second zone within the vehicle body structure.

2. The vehicle keyfob locator system according to claim 1, wherein
the keyfob locator control panel includes a manually operated switch connected to the controller that sends a signal to the controller in response to manual operation thereof causing the controller to determine the location of the keyfob within the vehicle body structure.

3. The vehicle keyfob locator system according to claim 1, wherein
the first zone corresponds to a first area of a passenger compartment within the vehicle and the second zone corresponds to one of a second area of the passenger compartment and a trunk space within the vehicle,
the controller is configured to determine whether the keyfob is located within one of the first zone and the second zone within the vehicle body structure, and
in response to determining that the keyfob is located within the one of the first zone and the second zone, the controller operates the display to display an indication of an approximate determined location of the keyfob as being within the corresponding one of the first zone and the second zone.

4. The vehicle keyfob locator system according to claim 1, wherein
the display is configured to display a simulated overhead view of a passenger compartment and a trunk space within the vehicle body structure, with the first zone being defined as a first area of the passenger compartment, and the second zone being defined as one of a second area of the passenger compartment and the trunk space; and
in response to the controller determining the location of the keyfob the determined location is overlaid on the simulated overhead view of the vehicle on the display.

5. The vehicle keyfob locator system according to claim 1, wherein
the display is configured to display a simulated side view of a passenger compartment and a trunk space of the vehicle with the first zone being defined as a first area of the passenger compartment and the second zone being defined as one of a second area of the passenger compartment and the trunk space, and
in response to the controller determining the location of the keyfob the determined location is displayed on the simulated side view on the display.

6. The vehicle keyfob locator system according to claim 1, wherein
at least one keyfob locator antenna of the plurality of keyfob locator antennas is installed proximate a first lateral side of a passenger compartment and at least one keyfob locator antenna is installed proximate a second lateral side of the passenger compartment.

7. The vehicle keyfob locator system according to claim 6, wherein
at least one keyfob locator antenna of the plurality of keyfob locator antennas is installed proximate a front area of the passenger compartment and at least one keyfob locator antenna is installed at a rear area of the vehicle body structure, and the first zone is defined as the front area of the passenger compartment and the second zone is defined as being at the rear area of the vehicle body structure.

8. A method for locating a vehicle keyfob comprising:
providing a vehicle body structure with a plurality of keyfob locator antennas at predetermined spaced apart locations;
requesting an electronic search to be conducted in order to determine a location of a keyfob within the vehicle body structure;
transmitting signals from each of the plurality of keyfob locator antennas;
processing received signals and determining whether or not the keyfob is located within the vehicle body structure and determining an approximate location of the keyfob within the vehicle body structure relative to a first zone defined within the vehicle body structure and a second zone defined within the vehicle body structure; and
displaying on a display within the vehicle the approximate location of the keyfob as being within one of the first zone and the second zone of the vehicle body structure.

9. The method according to claim 8, wherein
the first zone includes at least a portion of a passenger compartment within the vehicle body structure and the second zone including a trunk space within the vehicle body structure, and
the processing of received signals includes determining whether the keyfob is located within the trunk space of or within the portion of the passenger compartment defined within the vehicle body structure.

10. The method according to claim 8, wherein
the requesting of the electronic search for the keyfob includes a vehicle operator operating a manual switch on a keyfob locator control panel within a passenger compartment within the vehicle body structure, the manual switch being connected to a controller, the controller being configured to operate the plurality of keyfob locator antennas and to operate the display that displays the approximate location of the keyfob within the vehicle body structure.

11. The method according to claim 10, wherein
the transmitting of signals from the plurality of keyfob locator antennas includes receiving a signal or signals from the keyfob such that the controller processes the transmitted signals from the plurality of keyfob locator antennas and signal from the keyfob in order to determine the approximate location of the keyfob.

12. The method according to claim 8, wherein
the displaying on the display includes displaying a simulated overhead view of a passenger compartment and a trunk area of the vehicle body structure, and superimposing the approximate location on the simulated overhead view.

13. The method according to claim 8, wherein
the displaying on the display includes displaying a simulated side view of a passenger compartment and a trunk area of the vehicle body structure, and superimposing the approximate location on the simulated side view.

14. The method according to claim 8, wherein
the displaying on the display includes displaying a simulated rear view of a passenger compartment and a trunk area of the vehicle, and superimposing the approximate location on the simulated rear view.

15. The method according to claim 14, wherein
the displaying on the display includes displaying a simulated overhead view of the passenger compartment and the trunk area of the vehicle body structure, and superimposing the approximate location on the simulated overhead view.

16. The method according to claim 14, wherein
the displaying on the display includes displaying a simulated side view of the passenger compartment and the trunk area of the vehicle body structure, and superimposing the approximate location on the simulated side view.

17. A vehicle keyfob locator system comprising:
a keyfob locator control panel and a display located within a passenger compartment of a vehicle, the display being configured to display at least a first zone and a second zone defined relative to the passenger compartment of the vehicle, each of the first zone and the second zone corresponding to different locations relative to the passenger compartment of the vehicle;
a plurality of keyfob locator antennas installed at predetermined positions of a vehicle body structure of the vehicle;
a controller operably connected to the keyfob locator control panel, the display and each of the keyfob locator antennas, the controller being configured to operate the keyfob locator antennas and determine a location of a keyfob relative to the vehicle body structure in response to activation of the keyfob locator control panel and further configured to display on the display a location of the keyfob relative to the first zone and the second zone in response to determining the location of the keyfob relative to the first zone and the second zone.

18. The vehicle keyfob locator system according to claim 17, wherein the controller is configured to define the first zone as an area of that includes a forward portion of the passenger compartment, and the second zone as an area rearward of the first portion of the passenger compartment.

19. The vehicle keyfob locator system according to claim 17, wherein the controller is configured to define the first zone as an area of that includes a forward portion of the passenger compartment, define the second zone as an area that includes a rearward portion of the passenger compartment and define a third zone as being an area that includes a trunk space within the vehicle.

20. The vehicle keyfob locator system according to claim 17, wherein the controller is further configured to determine whether the keyfob is located within the vehicle and determine whether the keyfob is located outside the vehicle.

* * * * *